United States Patent Office.

NANCY PATTON, OF COLES COUNTY, ILLINOIS.

IMPROVED METHOD OF PRESERVING EGGS.

Specification forming part of Letters Patent No. 52,072, dated January 16, 1866.

*To all whom it may concern:*

Be it known that I, NANCY PATTON, of the county of Coles and State of Illinois, have invented and discovered a new and Improved Mode of Preventing Eggs of all kinds from Spoiling; and I do hereby declare that the following is a full and exact description thereof, reference being had to the chemicals used, effect on the egg, &c.

The nature of my discovery consists in the combination of certain chemicals, hereinafter described, which are dissolved in water, making a liquid which hardens the shell of the egg, renders the membrane which incloses the albugineous portion tough, strengthening the membrane or film which incloses the yelk, thus preventing it from becoming settled or mixed with the white of the egg, thus preserving the egg in a perfect state of freshness for the space of two years, or until such time as it may be needed for use, without affecting any of its essential qualities.

Eggs thus kept may be taken out of the pickle or liquid and shipped without any danger of spoiling, as they will keep sweet and perfect for many weeks during the hottest weather. The egg not only retains all the richness and flavor of the fresh egg, but the fomentation of the white when beaten is actually one-third greater than that of fresh eggs.

The following are the chemicals used, the proportion of each, and the process of using them, to wit: To one gallon of water take nine ounces (avoirdupois) quick (slaked) lime, three ounces (avoirdupois) common salt, twenty-nine grains (apothecary's weight) soda, fifteen grains (apothecary's weight) saltpeter, eighteen grains (apothecary's weight) cream tartar, forty-six grains (apothecary's weight) borax. The four last-named articles are to be dissolved by boiling in water, the salt to be dissolved in cold water. When thereby dissolved add to the above enough water to make one gallon of liquid, which is to be well stirred before using.

The process of packing is to put the liquid in a tight vessel open at top, then sprinkle the lime into the liquid till the bottom of the vessel is covered, then add one layer of eggs, then sprinkle lime again, and so on until the vessel is full, leaving the liquid one inch above the eggs; then cover the eggs with a cloth, and add about as much lime on the top of the cloth as there is on the bottom of the vessel, using the proportions above specified. Twenty gallons of this liquid will pack (125) one hundred and twenty-five dozen eggs. The cost of this process is about one-fourth of a cent to the dozen eggs. All the above-named articles are inclosed herewith and properly marked, except the water, which is not deemed necessary to send. The above amount will be enough for some five dozen eggs.

What I claim as my discovery, and desire to secure by Letters Patent, is—

The combination of the said chemicals in water, so that the liquid will harden and close the pores of the shell of the egg, toughen the membranes next to the shell and that inclosing the yelk, without destroying any of the essential qualities of the egg, but rather improving its flavor and quality.

NANCY PATTON.

Attest:
H. MUSGROVE,
H. H. TEEL.